May 30, 1939. W. S. HACKETT 2,160,730
CONFECTION
Filed Feb. 18, 1938
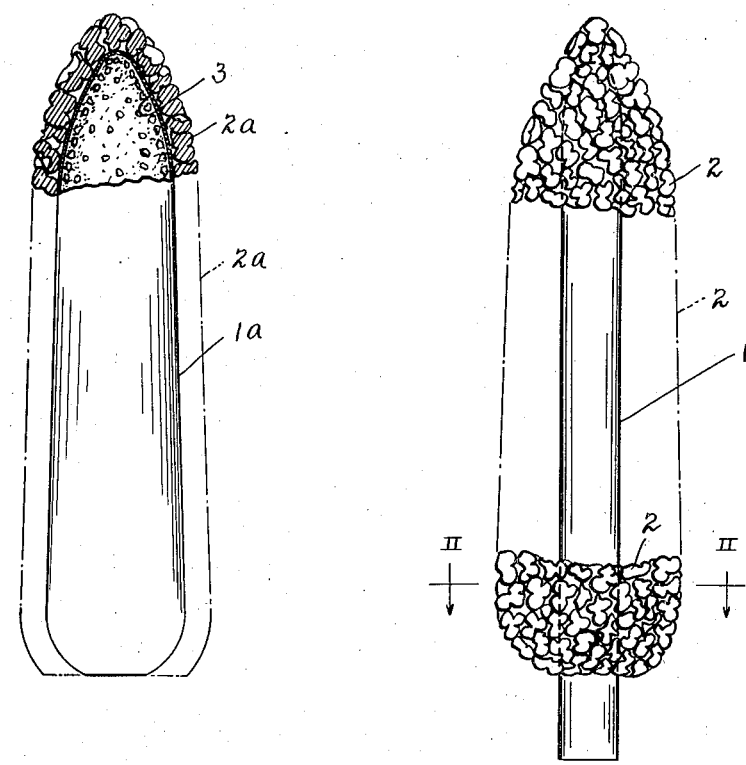
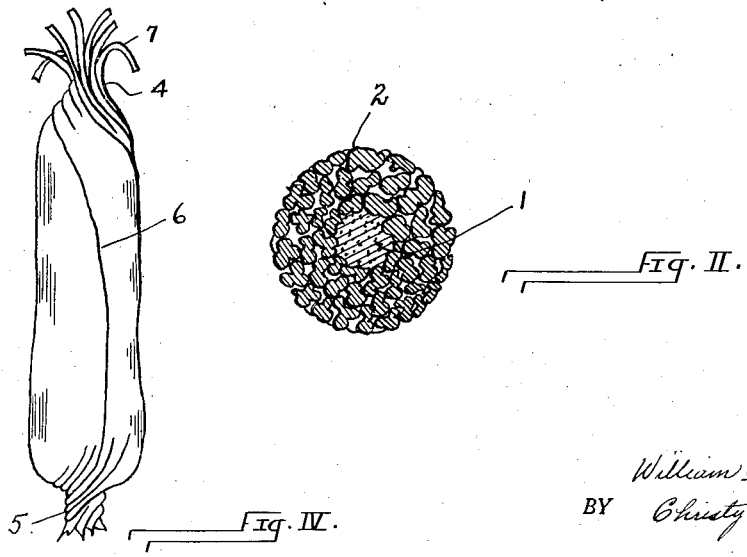
INVENTOR.
William S. Hackett
BY Christy and Wharton
ATTORNEYS.

Patented May 30, 1939

2,160,730

UNITED STATES PATENT OFFICE 2,160,730

CONFECTION

William S. Hackett, Wilkinsburg, Pa.

Application February 18, 1938, Serial No. 191,255

1 Claim. (Cl. 99—138)

My invention relates to confections, and particularly to candied pop-corn.

It has been common practice to form pop-corn in round balls, in which the popped or heat-exploded kernels of corn are held in assembly by means of a candy syrup.

In accordance with this invention the candied pop-corn is shaped into an elongate, relatively slender body, and such body is internally reinforced by an axially extending core of edible material. The advantages of so forming the confection are: first, it may be more readily wrapped or packaged for sale than the usual round ball; second, it may be more easily bitten into and eaten; and third, by forming the core of carefully selected and prepared candy compositions the confection as a whole may be rendered more tasteful.

In the accompanying drawings Fig. I is a fragmentary view of a confectionary article embodying the invention; Fig. II is a view in cross-section, taken on the plane II—II of Fig. I; Fig. III is a view to smaller scale, showing in side elevation the confection wrapped or packaged, to provide the ultimate article of commerce.

Referring to the drawing, the confection consists in an elongate core 1, upon which an enveloping body 2 of pop-corn is shaped and integrated. The core is formed of edible material, advantageously of a candy having substantial tensile strength or resistance to fracture. The candy of which the core is made may be a hard candy of solid (as distinguished from porous) structural order, or it may be a hard porous candy of known sort. Preferably, the candy is of a softer, slightly elastic character, such as taffy or "sponge" candy, the important thing being that the candy shall possess sufficient strength to withstand deterioration and disintegration during the normal period of time between the manufacture of the confection and its sale to the consumer.

As an example of the material which may be used in making the core, I give the following recipe:

In one-half gallon of water mix three pounds of glucose and nine pounds of granulated sugar; boil the resulting syrup to a temperature of 225 degrees F. in an open vessel; and then pour the syrup slowly into the beaten whites of six eggs, stirring constantly until the batch becomes stiff enough to be worked into the form of cores. If desired, chopped nut meats (or other particulate, edible material) may be mixed into the batch.

The particular way in which the batch is formed into cores is not the primary concern of this invention. Suffice it to say that, while the candy mix is still warm and plastic, it is shaped into cores 1. This may be done by molding the plastic material into individual units. Alternately, the material may be extruded in continuous length and cut into sections of proper length. When the cores cool, the candy of which they are made becomes relatively rigid. The cores are then ready to receive the enveloping bodies 2 of pop-corn.

The pop-corn, consisting of kernels of corn exploded under the influence of heat in known way, is mixed with a candy syrup in such proportions that each particle of pop-corn receives a thin coating of the syrup. A suitable syrup for the purpose may be made by mixing together one and one-half cups of granulated sugar, one-half cup of brown sugar, one-third cup of corn syrup, one-half teaspoon of salt, and one-half cup of water; the mixture is boiled over a slow fire until the "hard-crack" stage is reached, and then the material is removed from the fire and three teaspoons of butter are added and mixed in. The syrup thus made is poured over five quarts of pop-corn, and the mass is stirred until the syrup is uniformly distributed over the surfaces of the individual particles of pop-corn.

In proper quantity the syrup-coated pop-corn is applied to and molded (or otherwise shaped) upon each core 1 in the form of the elongate, relatively slender body 2, shown in this case in the form of an ear of corn. The pop-corn may be applied and shaped after the core has gained its ultimate state of hardness or rigidity, as mentioned above, but preferably the pop-corn is applied while the core is still in semi-rigid condition, with the consequence that the central grains or particles of pop-corn are partially embedded in the body of the core, as shown in cross-section in Fig. II. The shaped article, held together by the sticky syrup, is then allowed to stand in the open atmosphere. The syrup dries and hardens; the core reaches its ultimate condition of hardness or stiffness; and the integrated article is ready for consumption.

The core may lie wholly within the body of pop-corn or it may, with attending advantages in manufacture, extend from one end of the body of pop-corn, as shown in Fig. I. And as shown in both Figs. I and II, a body of pop-corn exceeds by several times the diameter of the core upon which it is molded.

In wrapping or packaging the finished confection, I advantageously provide a strip of waxed paper 6 of greater width than the length of the article. The confection is rolled in the strip of paper, and the paper is twisted at the opposite ends of the wrapped article, as indicated at 4 and 5 in Fig. IV. Thus, the confection is closed within a protective jacket, which, by the use of paper of green color, may be given the appearance of an unhusked ear of corn. One edge of the paper strip of which the wrapping is made may be slit to provide a multiplicity of ribbons 7 that further enhance the attractive appearance of the packaged confection.

I claim as my invention:

A candy cluster formed in counterfeit of an ear of corn and consisting of an elongate edible core of relatively small diameter formed in simulation of the cob of an ear of corn, a relatively thick surrounding mass of pop-corn integrated with sugar, built upon and internally embedded in the core and molded externally to the shape of a naked ear of corn, and a protecting jacket of a material resistant to the adhesion of the sugar-integrated mass of pop-corn and simulating the opaque husk of an ear of corn.

WILLIAM S. HACKETT.